Dec. 8, 1964     C. L. GARRETT     3,159,920
DEPTH INDICATOR FOR FISHING LINE
Filed June 2, 1961
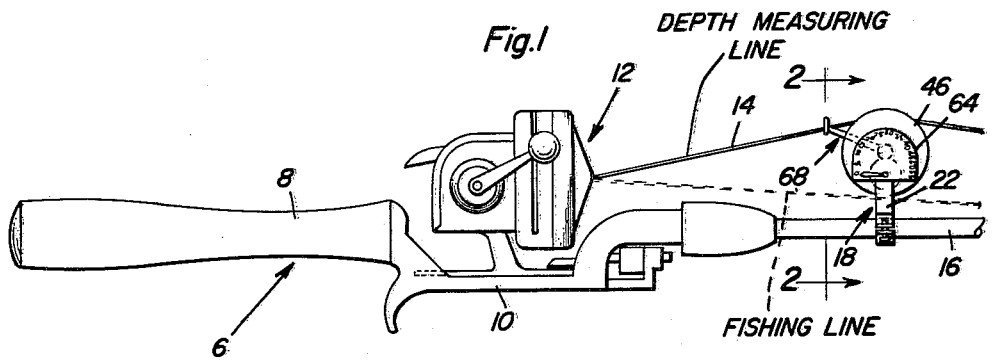
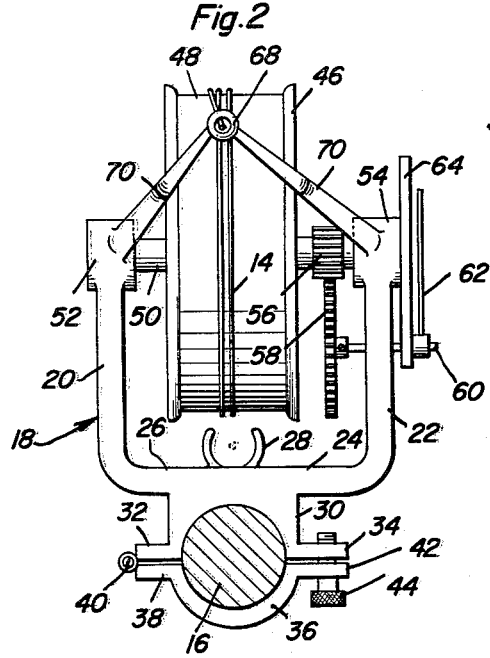
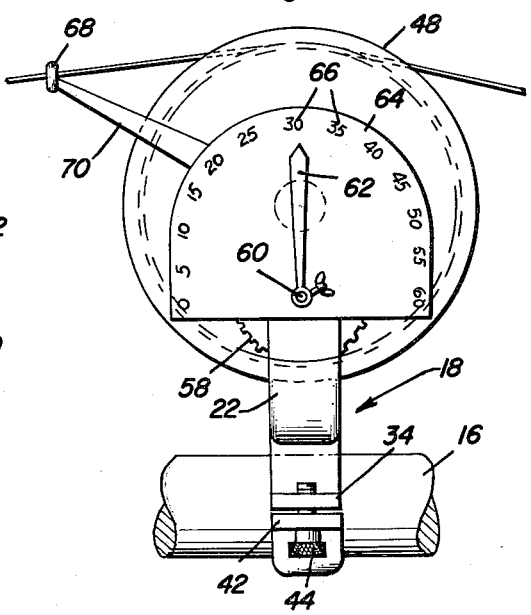
Clarence L. Garrett
INVENTOR.
BY *Clarence A. O'Brien*
*and Harvey B. Jacobson*
Attorneys

United States Patent Office 3,159,920
Patented Dec. 8, 1964

3,159,920
DEPTH INDICATOR FOR FISHING LINE
Clarence L. Garrett, 12 S. Addinsell, Phillips, Tex.
Filed June 2, 1961, Ser. No. 114,542
4 Claims. (Cl. 33—129)

The present invention relates to certain new and useful improvements in means which, when properly used, facilitate ascertaining and determining the depth of water which is to be fished at a predetermined fishing spot.

More in particular the invention comprises water depth determining means which involves the use, if desired, of an ordinary fishing rod and reel with a fishing line wound on the reel, an attachment being employed on the rod in advance of the reel and which serves to meter the amount of line which has been paid out and indicates the approximate fishing depth in a simple and reliable manner.

Briefly summarized the invention, from a combination standpoint, is characterized by a fishing rod, a reel mounted on said rod, a depth measuring line operatively mounted on said reel, a freely rotatable spool around which a portion of the line is removably wound and from and beyond which a free end of the line is paid out, means supporting and mounting said spool on the rod forwardly of the reel, a graduated dial fixed on said means and readily visible, an indicator cooperable with the dial and graduations thereon, and an operating connection between the spool and indicator.

Considered from a slightly different point of view the essence of the invention has to do with a simple, practical and economical rod attachment. This attachment is characterized by a bracket having means to attach same to said rod, said bracket having bearings, a shaft mounted for rotation in said bearings, a spool fixed on said shaft and rotatable with the shaft, a graduated dial fixed on said bracket, an indicator finger opposed to the dial and cooperable with the graduations thereon, and an operating connection between the finger and shaft.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in side elevation showing a conventional fishing rod and reel and illustrating the improved line-length metering attachment and how it is constructed and used;

FIGURE 2 is a view on a larger scale taken on the plane of the vertical line 2—2 of FIGURE 1; and FIGURE 3 is a side elevation observing the structure of FIGURE 2 in a direction from right to left.

As seen in FIGURE 1 the fishing rod 6 may be conventional. It comprises a handle or hand-grip 8 and a reel seat 10 on which a suitable spin-type reel 12 is mounted. The depth measuring line, which may be an ordinary fishing line, is denoted by the numeral 14. The lefthand end portion is wound on the spool of the reel (not shown). The part of the rod on which the attachment is mounted is denoted by the numeral 16.

Referring now to FIGURE 2 it will be observed that the attachment is characterized by a U-shaped bracket. The upstanding arms are denoted at 20 and 22 and the bight portion is designated at 24. The upper side 26 of this bight portion 24 is provided with suitable line guide means 28 to be hereinafter referred to. The bight portion also has a depending mount 30 which in turn is provided with coplanar outstanding lugs 32 and 34. These lugs serve to accommodate a rod clamp comprising a longitudinally bowed grip 36 having one end portion 38 hinged to the lug 32 as at 40. The other end portion 42 is opposed to the ear or lug 34 and these parts are constructed to accommodate a suitably knurled and threaded assembling and retaining screw 44.

The measuring spool is denoted by the numeral 46, the periphery thereof being denoted at 48. This spool is mounted on a horizontal shaft 50 the ends of which are journaled for free rotation in bearings 52 and 54 at the upper ends of the arms 20 and 22. The shaft adjacent the bearing 52 is provided with a pinion 56 which is in mesh with a gear 58 transmitting motion to an auxiliary shaft 60. This auxiliary shaft is provided with a fixed indicator finger 62 which is opposed and parallel to a surface of the dial 64. This dial comprises a sector-shaped plate which is fixedly mounted on the bearing and which is provided around its marginal portion with suitably spaced graduations 66 which serve to indicate the amount of line which is or has been paid out with a view toward determining the depth of the water at the spot to be fished.

The numeral 68 designates a line guide eye carried by the converging connected ends of a pair of oblique angled arms 70 which are directed rearwardly and which have their forward ends integrally joined with the respective bearings 52 and 54 as seen in FIGURE 2.

It may be advisable or necessary to employ suitable ratchet mechanism (not shown) to insure proper operation of the spool and the gearing. It will also be evident that the circumference of the spool and the size of the meshing gears must be such that when a given amount of line is paid out, the indicating finger will show the results on the dial and thus enable the user to ascertain the depth at a selected fishing spot or place. In actual practice it is suggested that the fishing line should be wound at least two times around the periphery of the spool to avoid slippage and to insure effective metering and indicating results. Then, too, it may be necessary to change the graduation system on the dial or perhaps to employ some suitable quick release means (not shown) for reeling in the measuring line.

It will be further noted in the drawing as shown in dotted lines in FIGURE 1 that the aforementioned line guide 28 may be employed for bypassing the line to clear the spool so that the fisherman can cast his line without using the metering device. The principal idea in the instant invention is in reference to the spool and attachment means on the rod 16 which functions to measure the amount of line which has been paid out for depth determining needs. The fishing step may be, if desired, taken care of by another rod and reel (not shown) separate from the one shown. Also it is within the purview of the invention to release the clamping means shown in FIGURE 2 and to bodily swing the entire attachment around the rod through approximately 180 degrees placing the attachment on the bottom side of the rod, after removing the line 14 from the spool 46. With this mode of use the attachment will then not be in the way and a conventional cast may be undertaken.

This invention is such in construction that the reel may be faced to favor either right-handed or left-handed casting. Therefore, the drawing and specification should be construed accordingly.

It is believed that a careful consideration of the description in conjunction with the views of the drawing will enable the reader to obtain a clear understanding of the invention. Therefore a more extensive description is believed to be unnecessary.

Minor changes in shape, size, and rearrangement of component parts may be resorted to in actual practice without departing from the spirit of the invention or the invention as claimed.

What is claimed as new is as follows:

1. A depth measuring attachment for a reel-equipped rod comprising a one-piece U-shaped bracket embodying opposed spaced parallel arms rigidly connected at like ends by a solid intervening bight portion, said arms having terminal bearings aligned with each other, said bight portion having a mount provided with clamping means adapted to be removably clamped on said rod, a shaft spanning the space between the arms and having end portions journaled for rotation in their respective bearings, a spool fixed on the median portion of said shaft, said spool serving to permit a depth measuring line to be wound thereon, a graduated dial fixedly mounted on an exterior side of one of said bearings and spaced from and parallel to the adjacent bracket arm, an indicator finger parallel to and cooperating with said dial, an operating connection between the finger and shaft, and rigid line guide means comprising a single line guide eye and a pair of upwardly and rearwardly angled legs, said legs having upper converging end portions connected to and joining the eye therewith and having their outwardly and downwardly directed end portions joined integrally with their respectively cooperating bearings, said legs bridging the space between the bearings and positioning the guide eye in a plane above the upper ends of the respective bearings, whereby to orient the position of said eye relative to the intended peripheral portion of said spool.

2. A depth measuring attachment for a reel-equipped rod comprising: a one-piece U-shaped bracket embodying a bight portion provided at its ends with like coplanar arms, said arms having terminal axially aligned bearings, said bight portion having a bottom side provided with a depending block-like mount provided with coplanar outstanding ears, a rod embracing clamp comprising a bowed rod grip, said clamp having one end hingedly connected to one of said ears and the other end separably joined to the other ear, a first shaft spanning the space between said arms and having end portions journaled for rotation in their respective bearings, a spool fixed on a median portion of the shaft and freely rotatable between said arms, a first line guide eye, legs secured at lower ends to said bearings and at upper ends to said eye, the periphery of said spool being parallel with and spaced from said bight portion, a second optionally usable line guide carried by the upper side of the bight portion and located midway of the space between said bracket arms and situated in the space between the bight portion and periphery of said spool, a second shaft auxiliary to said first shaft and mounted for driven rotation intermediate its ends on one of said arms, an operating connection between an end portion of the first shaft and an inner end of said second shaft, a dial plate arranged exteriorly of said bracket and fixed to and supported by one of said bearings, the outer end of said second shaft being supported for rotation by a portion of said dial plate and the terminal outer end of said second shaft being provided with an indicator finger parallel to and cooperable with the face of said dial plate.

3. A depth measuring attachment for a reel-equipped rod comprising: a one-piece U-shaped bracket embodying a bight portion provided at its ends with like coplanar arms, said arms having terminal axially aligned bearings, said bight portion having a bottom side provided with a depending block-like mount provided with coplanar outstanding ears, a rod embracing clamp comprising a bowed rod grip, said clamp having one end hingedly connected to one of said ears and the other end separably joined to the other ear, a first shaft spanning the space between said arms and having end portions journaled for rotation in their respective bearings, a spool fixed on a median portion of the shaft and freely rotatable between said arms, a graduated dial fixedly mounted on an exterior side of one of said bearings and spaced from and parallel to the adjacent bracket arm, an indicator finger parallel to and cooperating with said dial, an operating connection between the finger and shaft, and line centering guide means comprising a single guide eye and a pair of upwardly rearwardly angled legs, said legs having upper converging end portions connected to and rigidly joining the eye therewith and having their outwardly downwardly diverging end portions joined integrally with their respectively cooperating bearings whereby said legs bridge the space between the bearings and serve to position the guide eye in a plane above the upper ends of the respective bearings, whereby to thus orient the position of said guide eye relative to the intended cooperating peripheral portion of said spool.

4. A depth measuring attachment for a reel-equipped rod comprising: a one-piece U-shaped bracket embodying a bight portion provided at its ends with like coplanar arms, said arms having terminal axially aligned bearings, said bight portion having a bottom side provided with a depending block-like mount provided with coplanar outstanding ears, a rod-embracing clamp comprising a bowed rod grip, said clamp having one end hingedly connected to one of said ears and the other end separably joined to the other ear, a first shaft spanning the space between said arms and having end portions journaled for rotation in their respective bearings, a spool fixed on a median portion of the shaft and freely rotatable between said arms, a motion-transmitting pinion fixed on an end portion of said first shaft between one side of said spool and the adjacent bearing, a gear fixed on the inner end of a second shaft and meshing with said pinion, a graduated plate constituting a dial, said plate being arranged exteriorly of said bracket, said plate being parallel to a cooperating side of said reel and parallel to an adjacent outer side of the cooperating bracket arm, that portion of the plate which is opposed to said bracket arm being provided with a bearing, the outer end of said second shaft being mounted for rotation in said bearing and projecting beyond the outer side of said dial plate, and an indicator finger carried by the outer end of said second shaft and disposed in parallel relation to and cooperable with the face of said dial plate.

References Cited in the file of this patent
UNITED STATES PATENTS

| | | |
|---|---|---|
| 775,118 | Rollston | Nov. 15, 1904 |
| 1,125,107 | Jacques | Jan. 19, 1915 |
| 2,637,112 | La Fontaine et al. | May 5, 1952 |
| 2,762,129 | Morgan | Sept. 11, 1956 |